(12) United States Patent
Widly et al.

(10) Patent No.: US 9,162,193 B2
(45) Date of Patent: Oct. 20, 2015

(54) METHOD AND APPARATUS FOR CREATING AN IMPROVED FILL FOR FRAMELESS FURNITURE AND THE LIKE

(71) Applicants: John R Widly, Santa Ana, CA (US); Chris Vanderhagen, Santa Ana, CA (US)

(72) Inventors: John R Widly, Santa Ana, CA (US); Chris Vanderhagen, Santa Ana, CA (US)

( * ) Notice: Subject to any disclaimer, the term of this patent is extended or adjusted under 35 U.S.C. 154(b) by 237 days.

(21) Appl. No.: 13/694,601

(22) Filed: Dec. 17, 2012

(65) Prior Publication Data
US 2014/0171532 A1    Jun. 19, 2014

(51) Int. Cl.
*B01F 3/18*   (2006.01)
*B01F 5/16*   (2006.01)
*B29B 7/60*   (2006.01)

(52) U.S. Cl.
CPC ... *B01F 5/16* (2013.01); *B01F 3/18* (2013.01); *B29B 7/603* (2013.01)

(58) Field of Classification Search
CPC .............. B01F 5/16; B01F 3/18; B29B 7/603
USPC ............................................... 366/101, 160.5
See application file for complete search history.

(56) References Cited

U.S. PATENT DOCUMENTS

| | | | | |
|---|---|---|---|---|
| 2,650,058 | A | * | 8/1953 | Read ................................ 177/59 |
| 4,963,172 | A | * | 10/1990 | DeMarco ......................... 55/429 |
| 2006/0013061 | A1 | * | 1/2006 | Bivens et al. .................... 366/16 |

* cited by examiner

*Primary Examiner* — Tony G Soohoo
(74) *Attorney, Agent, or Firm* — Donald Webber, Jr.

(57) ABSTRACT

A fill material which includes first and second types of polymers which are mixed together to be used for filling frameless furniture or the like as well as the method and apparatus for making the fill material and supplying the fill material to a frameless furniture sheath.

17 Claims, 7 Drawing Sheets

METHOD AND APPARATUS FOR CREATING AN IMPROVED FILL FOR FRAMELESS FURNITURE AND THE LIKE

CO-PENDING APPLICATION

Reference is made to co-pending application entitled METHOD AND APPARATUS FOR CREATING AN IMPROVED FILL FOR FRAMELESS FURNITURE AND THE LIKE, filed Dec. 5, 2011, bearing Ser. No. 13/373,876 by John R. Widly and Chris Vanderhagen.

FIELD OF THE INVENTION

The present invention relates, in general, to a filler comprising a mixture of expanded polystyrene beads and fiber polymer that can be used in a number of frameless products including pillows, bean bags, futons and the like.

BACKGROUND

As discussed in the co-pending application identified above, frameless furniture including chairs, futons, bean bags and the like has been known in the art for many years. In the context of this application, all of these terms are used interchangeably. Furthermore, frameless furniture filled with only beads of polystyrene or with only polyester foam has been known in the art.

While such conventional beanbag furniture is quite popular, the shape-ability, among other things, remains a problem. For example, after a conventional beanbag has been occupied by a person, the expanded polystyrene (EPS) beads within the liner of the beanbag remain substantially compressed, resulting in a depression which remains until the beanbag is reshaped by rolling, shaking, fluffing or the like.

Another drawback of beanbags filled solely with beads is that the beads (aka beads or pellets) can be hard, and, in time, may result in the occupant being uncomfortable.

Another deficiency in such frameless (or soft) furniture is that the beads compress fairly quickly such that the furniture becomes "flat" and needs to be refilled with beads. Likewise, the polystyrene beads do not have any inherent ability to return the chair to its original shape after the occupant departs therefrom.

Some solutions to these problems of frameless furniture are described in U.S. Pat. No. 6,725,482 and in U.S. Pat. No. 6,732,391, both of which are hereby incorporated by reference in their entirety. These patents disclose that conventional inexpensive polystyrene beads are replaced by commercially available polyurethane foam pieces. These patents also disclose that certain species of polyurethane foam are both compressible and resilient having sufficient compressibility to conform to the occupant's shape and sufficient resiliency to fill out the chair when unoccupied.

Similarly, the soft furniture which is filled solely with polyurethane foam pieces thereof also has limitations. For example, the foam pieces do not provide the "fluid feel" of polystyrene beads in beanbag furniture because the foam does not have the ability of the beads to move with respect to each other.

The present invention provides another solution to the above-mentioned problems related to frameless furniture.

SUMMARY OF THE INVENTION

The invention provides an apparatus for producing a fill material similar to that described in the co-pending application.

Embodiments of an apparatus to perform the mixing and filling process using an accurately measured quantity of the ESP beads are described. The embodiments differ in the manner of delivering the opened polyester and/or the EPS beads to the mixing component for combining the fill constituents.

Figure 1:
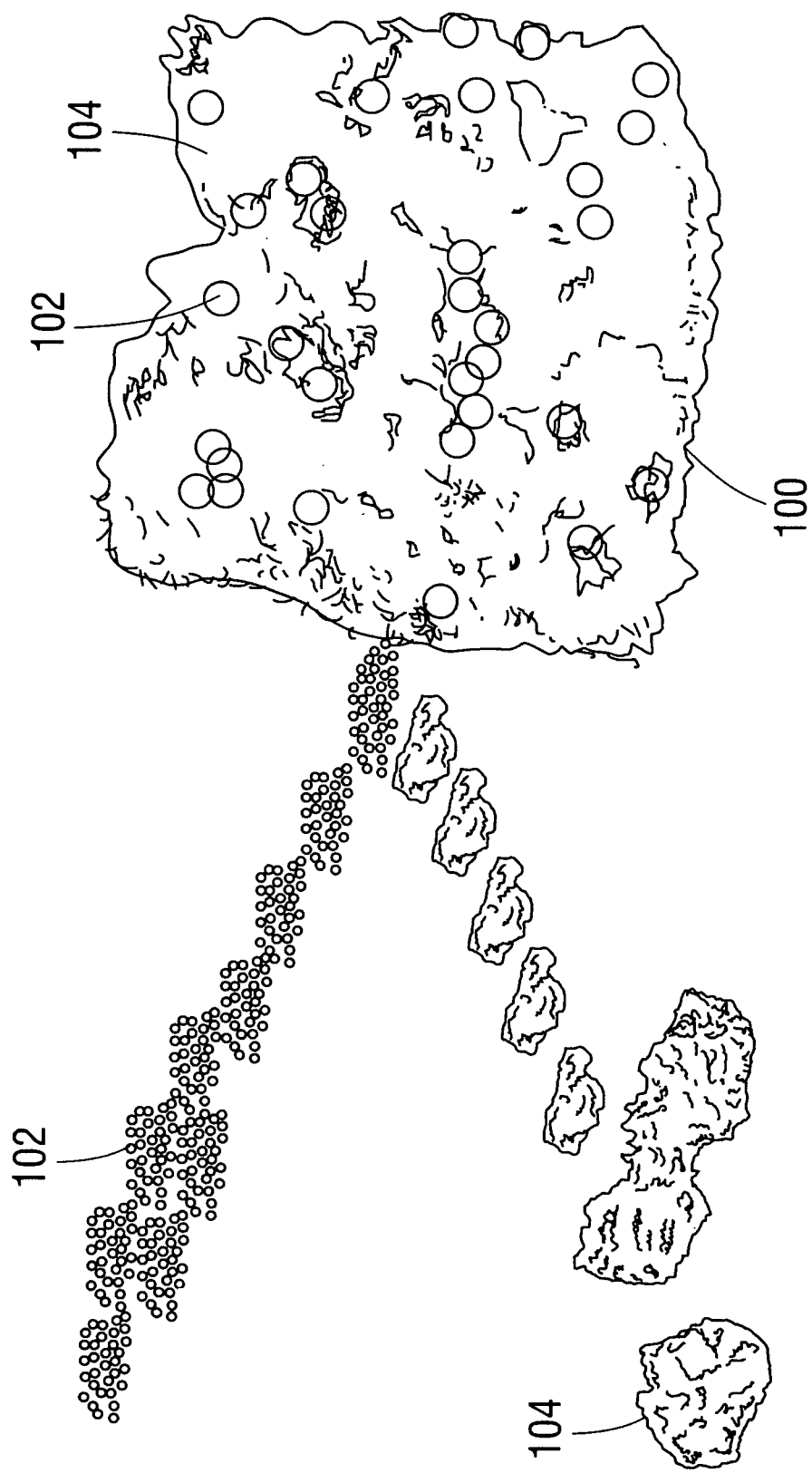
FIG. 1 illustrates a prior art fill mixture produced in accordance with the teachings of the present invention.

For convenience, common components bear common reference numerals in the Figures and in the following description.

DESCRIPTION OF A PREFERRED EMBODIMENT

FIG. 1 illustrates a mixture 100 of expanded polystyrene (EPS) beads 102 and an opened polyester fiber 104 which are blended together.

The beads 102 are conventional expanded polystyrene (EPS) beads which are relatively stiff yet compressible. For example, the approximate common densities of EPS beads are 0.4 to 2.4 lbs/ft$^3$ or as desired. The beads are spherical.

The opened polyester fiber is far less rigid and more resilient than beads 102. In contrast to the beads 102, the fiber 104, typically, does not move as easily within the soft furniture or the like. Typically, the beads 102 have generally regular (smooth) surfaces and become embedded into the fiber 104. Thus, the beads maintain the same position with respect to the fiber when the components are mixed together. Consequently, the beads 102 do not move freely with respect to each other so that the utility device, for example frameless furniture, retains any displacement such as a user sitting thereon.

The composite blend 100 comprises at least a portion thereof which is the currently utilized materials, namely, expanded polystyrene beads This portion of the blend represents, typically, 40% of the blend, by volume, The remainder of the blend comprises opened polyester. This part of the blend represents, typically, 60% of the blend, by volume.

While one preferred blend is the 60:40 composition noted above, it should be understood that the blend can have virtually any ratio from 90:10 to 10:90, by volume. The ratio is determined by several considerations including cost. Polyester fibers are, typically, more expensive. Thus, reduced cost of the end products can be achieved by altering the composition mix as noted.

The composite mixture of beads 102 and fiber 104 is sufficiently fluid so that the beanbag form (i.e. skin) which is filled therewith tends to mold to the body shape when sat upon. However, the mixture 100 is sufficiently rigid so that the beanbag (or the like) retains the shape in which it has been produced and does not tend to flatten out.

Figure 2:
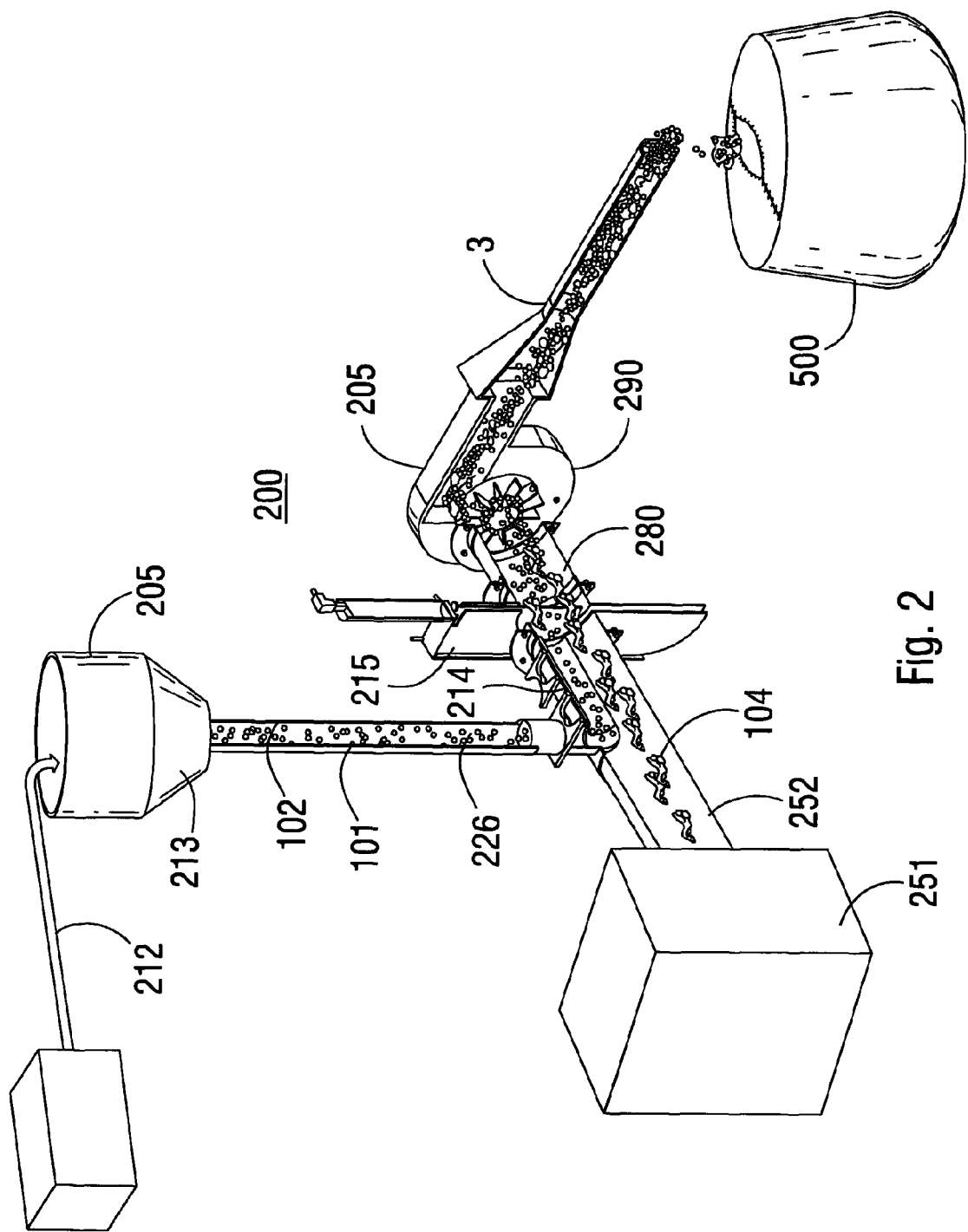
FIG. 2 is a schematic representation of an apparatus which is used to produce the fill mixture shown in FIG. 1 and supply same to a fabrication site.

FIG. 2 is a basic functional schematic representation of a system or apparatus 200 for implementing the process described supra which provides the blended materials 100 to fill a container.

The apparatus 200 includes source 201 for supplying the EPS pellets 101 (see FIG. 1). Source 201 is largely of conventional configuration such as is known in the art.

A source 251 is used for supplying the opened fiber material 104 (see FIG. 1) such as polyethylene, polyester, polypropylene fiber or the like. The source 251 can be a combing and carding apparatus which is largely conventional and known in the art, as well.

The polyester material 104 is quite light in weight and is, typically, fed via the source 251 into a tube or conduit 252.

The beads 102, individual loose pieces with a suitable size and weight, are supplied by any suitable source 201. The beads can be transferred from source 201 via conduit 212 to hopper 211 (see FIG. 3) made of canvas, metal or the like for storing the pellets which are then gravity fed into tower 405, (see infra).

Tower 205 includes a gate 213 which is selectively opened and closed in order to store and control the quantity of beads 102 supplied to conduit 214. By adjusting the size of the gate 213, and the trigger mechanism associated therewith, the number of beads passing therethrough from tower 205 can be accurately controlled. Typically, gate 213 is integrally formed with the tower 205 and is selectively operable when a preselected quantity of beads by volume and/or weight is detected.

Conduit 226 (or an equivalent) is mounted to tube 252. The tube 226 passes through the perimeter of tube 252 and is referred to as conduit 214 in the interior thereof. This structure can be accomplished by a single conduit or by several interconnected conduit portions.

Barrier gate mechanism 215 (see also FIG. 5) is movably mounted across conduit 252 and is operative to selectively interdict the flow of polyester material 104 and beads 102 therethrough. When a furniture (or other) filling process is to be initiated, gate 215 is displaced thereby permitting the blower 240 to create an airflow therethrough. Under the influence of this air flow, the beads 102 and the polyester fiber 104 are simultaneously and concurrently drawn into chamber 280 where they intermix.

The beads 102 interact with and are engaged with and adhered to the polyester fiber 104 as described supra. By adjusting gate 213 in tower 205, the ratio of beads-to-fiber, by volume, is accurately controlled as described infra.

The fiber/bead combination 100 is transferred from chamber 280 to blower 290 where is it further treated and blown through the fill tube 300 to a utilization device 500 for filling thereof.

Figure 3:
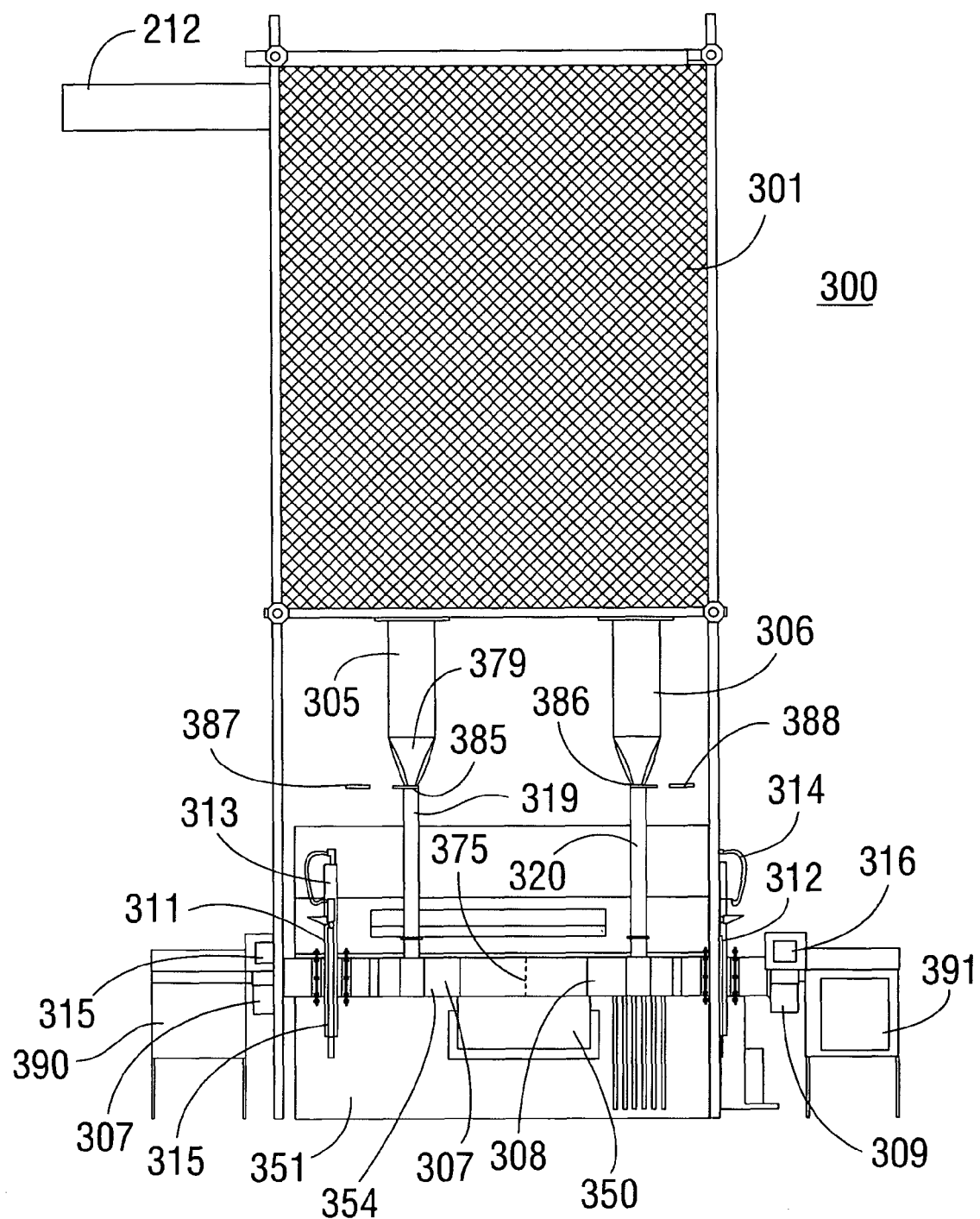
FIG. 3 is a front elevation view of one embodiment of a filling apparatus of the invention.

Referring now to FIG. 3, there is shown a more complete depiction of one embodiment of fill apparatus 300 in accordance with the subject invention. This embodiment represents an apparatus adapted to perform fill operations into two utilization devices concurrently. It is to be understood that the number of fill operations performed is not limited to two but can be readily adapted to any desired number.

The fill apparatus 300 includes a conventional treatment apparatus 351 which provides a high quality polyester fiber. Apparatus 351 may include a combing and carding capability. This apparatus and the operation thereof is relatively conventional in the art. The opened fiber is discharged through the outlet port 350 of apparatus 351.

Supply conduit 212 is provided to transfer EPS beads 102 from a suitable source 201 (see FIG. 2) to a storage hopper 301 which is, typically, disposed above the treatment apparatus 351 although this is not an absolute requirement for operation of the fill apparatus 300.

In this embodiment, the output of hopper 301 is supplied to a pair of individual towers 305 and 306 in order to selectively transfer the EPS beads 102 from hopper 371 to the blending chambers 307 and 308, respectively, for combination with the opened fiber 104 produced by apparatus 351, as described supra.

As will be described in greater detail hereinafter, the towers 305 and 306 are generally cylindrical in configuration. While other shapes can be utilized, the cylinder body is considered most efficacious.

Gates 385 and 386 are disposed at a suitable location within or adjacent to the cylinders 305 and 306, respectively. The gates are normally in the closed position to prevent the flow of beads from the cylinder. The gates are operated by control units 387 and 388, respectively, so that the gates are selectively moved from the closed (blocking) position whereupon any beads 102 retained by one (or both) of the cylinders are permitted to free-fall into the blending chambers 307 and 308 to be selectively combined with the fibers 104.

In this embodiment, the cylindrical towers 305 and 306 are shown to include conical bottoms which operate to funnel the beads into the ducts 319 and 320.

The gates 387 and 388 can be installed at any convenient location in the towers. However, installation of the gate 387 and 388 at the upper or lower end of the conical bottoms is preferable.

The blending chambers 307 and 308 receive polyfiber materials 104 from apparatus 351 via the output chute 350. Mounted at the opposite ends of blending chambers 307 and 308 are blowers 309 and 310, respectively. The blowers are, typically, fairly large capacity radial blade fans 308 and 309 driven by motors 390 and 391, respectively. These fans create significant airflow through the blending chambers 307 and 308. In the case of multiple EPS bead feeding conduits 305 and 306 into a common blending chamber as shown, an optional barrier 375 (shown in dashed lines) can be inserted at the midpoint of the blending chamber, if desired.

The air flow created by blowers 309 and 310 is sufficient to move the polyfiber material 104 from the apparatus 351 and the EPS bead materials 102 from towers 305 and 306 toward the outer ends of the blending chambers 307 and 308.

Gates 311 and 312 are provided intermediate the blowers 309 and 310 and the respective ends of the chambers 307 and 308. The positions of these gates (open or closed) are controlled by hydraulic activators 313 and 314 or other suitable devices. By selecting the positions of gates 311 and 312, the airflow and, thus, the movement of the materials through the respective blending chambers can be controlled.

Intermediate the gates 311 and 312 and the respective blowers 309 and 310 are the output ports 315 and 316, respectively. The output ports are adapted to be engaged with the appropriate "skins" or similar elements (see infra) to be filled with the product combination described supra.

Figure 4:
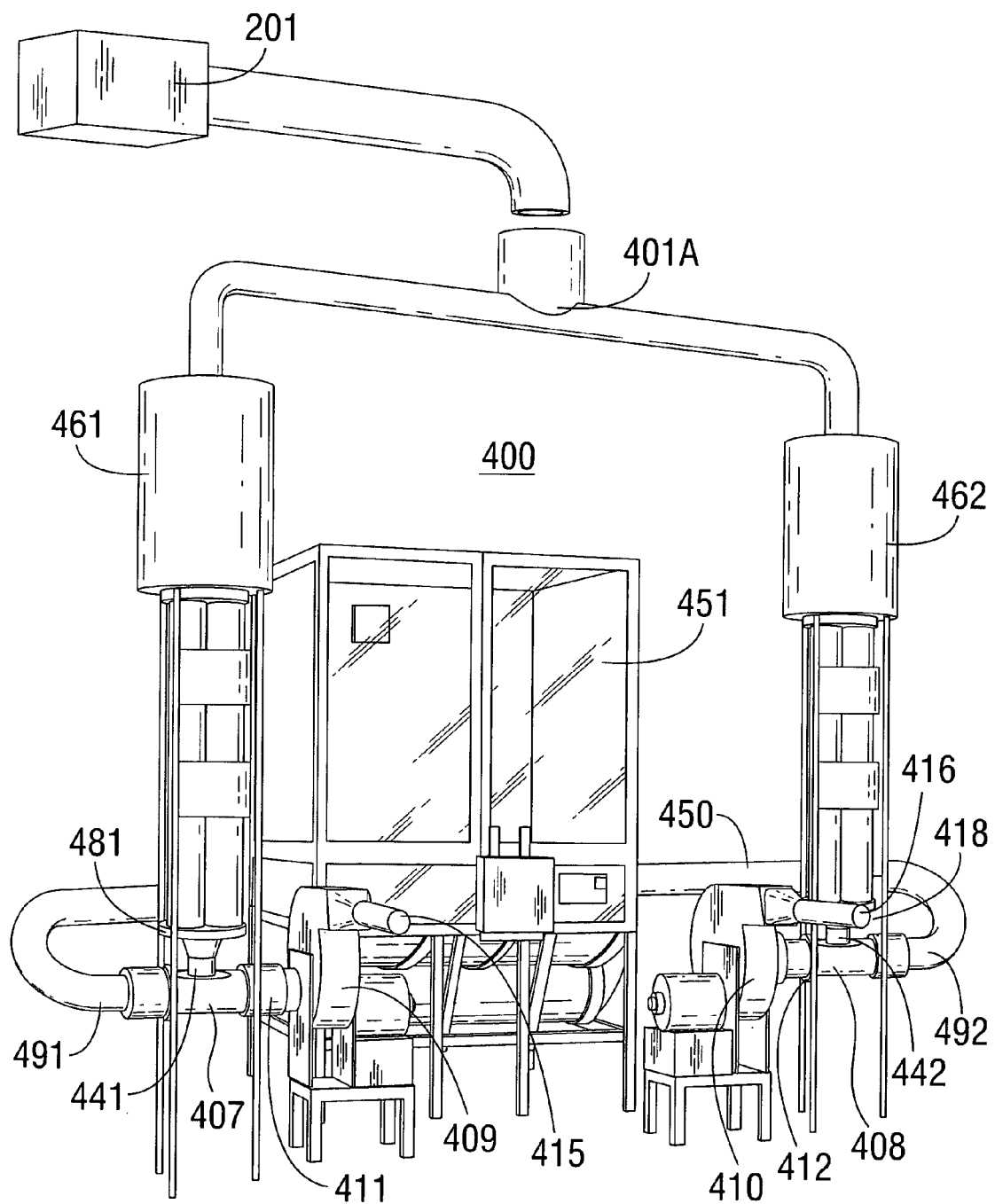
FIG. 4 is an oblique view of another embodiment of a filling apparatus of the invention.

Referring now to FIG. 4, there is shown another embodiment of a fill apparatus in accord with the subject invention. This embodiment provides an apparatus 400 which is adapted to perform fill operations into two utilization devices concurrently. Again it is to be understood that the number of fill operations performed is not limited to two but can be readily adapted to any desired number.

The fill apparatus 400 includes a storage chamber 451 for storing a large quantity of a high quality polyester fiber 104 which is produced by any suitable combing and carding mechanism similar to the fiber source 251 shown in FIGS. 2 and 3. The opened fiber is, typically, blown into storage chamber 451 from a source (not shown) by a blower device. The fiber is discharged from the chamber 451 through one or more outlet ports 491 and 492. The outlet ports can be formed of flexible conduits which are joined to one end of the blending chambers 407 and 408, respectively.

A supply conduit 401A is provided to transfer EPS beads 102 from source 201 (see FIG. 2) to storage hoppers 461 and 462 This arrangement of the apparatus 400 is, typically, adapted to operational facilities with height restrictions which could restrict the configuration of the apparatus. Also, the towers 461 and/or 462 are individually positionable relative to the storage chamber 451. The lower portions of hoppers 461 and 462 are joined to the blending chambers 407 and 408, respectively, at a midpoint in each.

As noted, the blending chambers 407 and 408 receive polyfiber materials at one end thereof from chamber 451 via the respective output ports 491 and 492. Mounted at the opposite ends of blending chambers 407 and 408 are blowers 409 and 410, respectively. The blowers are, typically, fairly large capacity radial blade fans which create significant airflow through the respective blending chambers 407 and 408 to transfer the fiber and the beads.

The air flow created by blowers 409 and 410 is sufficient to move the polyfiber material 104 from the storage chamber 451 and the EPS bead materials 102 from towers 460 and 461 toward the outer ends of the blending chambers 407 and 408, respectively.

Gates 411 and 412 are provided intermediate the respective blowers 409 and 410 and the ends of the respective chambers 407 and 408. The positions of these gates (i.e., open or closed) are controlled by hydraulic activators similar to the activators 313 and 314 shown in FIG. 3 or other suitable devices. By selecting the positions of gates 411 and 412, the airflow and, thus, the movement of the materials can be controlled. Thus, the EPS beads 102 will be combined with the opened fiber 106 supplied by storage chamber 451 as described supra.

Output ports 415 and 416, respectively, are adapted to be engaged with the appropriate "skins" or similar elements (see infra) to be filled with the product combination described supra.

As will be described in greater detail hereinafter, the towers 461 and 462 are generally cylindrical in configuration. While other shapes can be utilized, the cylinder body is considered most efficacious.

Gates 441 and 442 are disposed at a suitable location typically, at the lower ends of the cylinders 461 and 462, respectively.

In many applications, the gates 441 and 442 can be mounted directly to the blending chambers 407 and 408. In this case, the gates are constructed to interface with the end portions of hoppers 461 and 462, respectively.

The gates 441 and 442 are normally in the closed position to prevent the flow of beads from the cylinders. The gates are operated by control units 481 and 482, respectively, so that the gates are selectively moved from the closed (blocking) position to the open position whereupon any beads 102 which had been retained in the towers by one (or both) of the gates are permitted to free-fall into the blending chambers to be selectively combined with the fibers 104.

In this embodiment, the cylindrical towers 461 and 462 are shown to include generally cylindrical bottoms which operate to supply the beads to the blending chambers.

The gates 441 and 442 can be installed at any convenient location in the towers. However, in this embodiment, installation of the gate 441 and 442 at the lower ends of the cylindrical bottoms is preferable.

Figure 5:
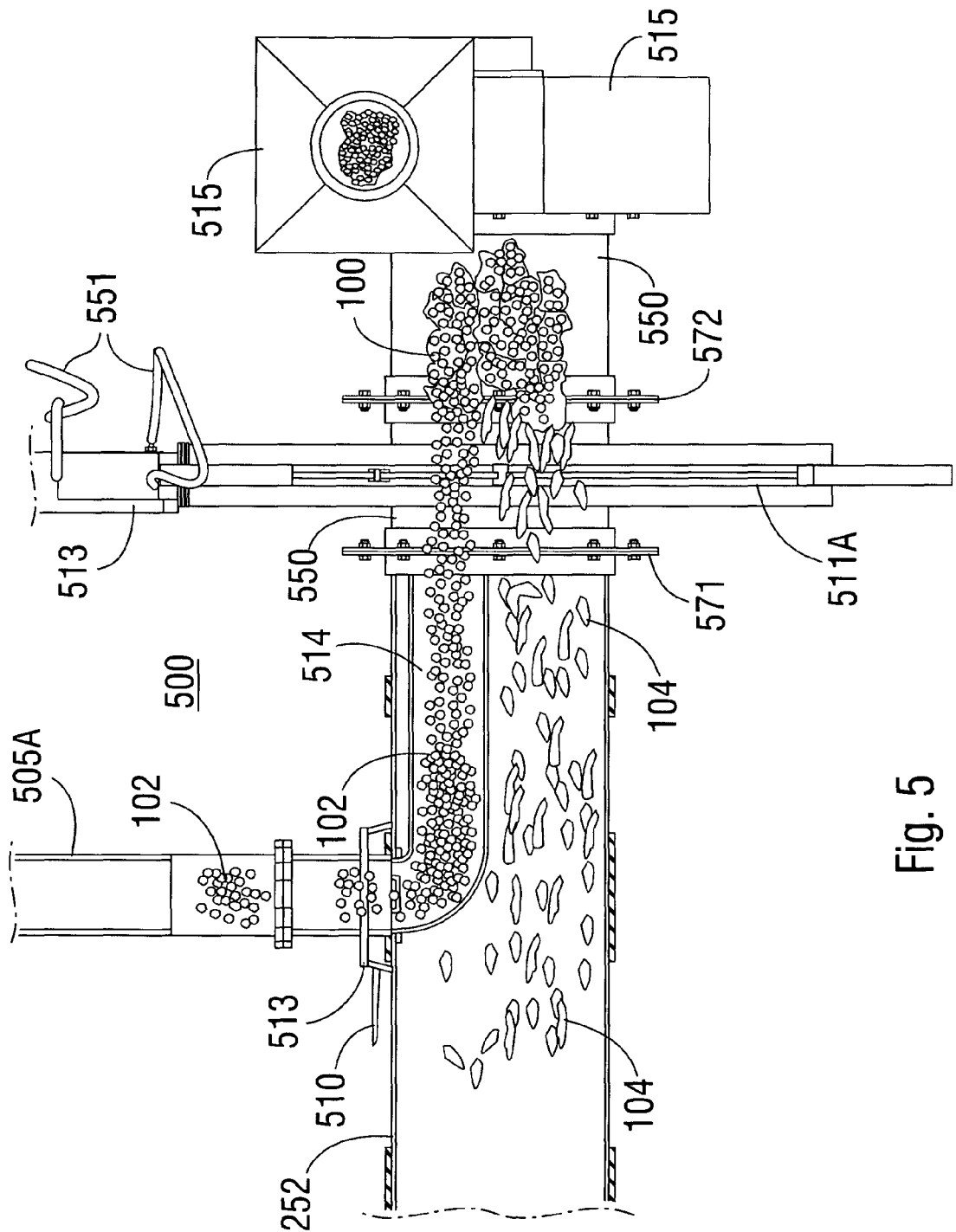
FIG. 5 is an enlarged, partially cross-sectional view of a gating mechanism utilized in the embodiments shown in FIGS. 3 and 4.

FIG. 5 is an enlarged portion of gate mechanism 511 which corresponds to gate 311 (or 411) and adjacent components shown in FIG. 3 (or 4). Some portions of the gating mechanism and components are shown in cross section for clarity.

In this embodiment, the flange 571 couples the conduit 252 to the input side of gate 500. Similarly, flange 572 is used to couple the output side of gate 511 to the output conduit 550 which is interconnected with blower 509. Gates 312 and 412 in FIGS. 3 and 4 are of similar construction.

The conduit 505A from the source of EPS beads (e.g. tower 461 in FIG. 4) is shown in cross-section with a plurality of the beads 102 therein. The gate 513 mounted to the body of blending chamber 550, in line with conduit 505A as described supra. The position (open/closed) of gate 513 is controlled manually by any convenient or conventional apparatus 510 (shown schematically).

Conduit 514 is, in effect, mounted internally of conduit 252 through which the fibers 104 pass as described relative to FIG. 2. The beads 102 and the fibers 104 are blended in the blender section 550 when gate 511 is opened.

Gate 511 includes a barrier 511A which is used to selectively open and close the gate 511. The position of barrier 511A is controlled by the pneumatic actuator 513, for example. The control signals for actuator 513 are supplied via the control conduit 551 which can be operated by any suitable means (not shown) including a foot pedal or the like.

When the barrier 511A is in the closed position (as shown in FIG. 5), the mixture of components 102 and 104 does not fully interact and does not pass through gate 511.

Conversely, when the barrier 511A is opened (or removed) from gate 511 by operation of the actuator 513, the components 102 and 104 are passed therethrough concurrently and combined as the composite blend 100 in blender 550. The blend 100 is supplied to the output unit 515 which, typically, includes a blower 509 (see FIG. 4). The circular blower 509 rotates to further mix the beads 102 and the fibers 104. The blend (or composite mixture) 100 is then expelled from the blower 509 via nozzle 515 into the utility device (see FIGS. 2 and 6).

Figure 6:
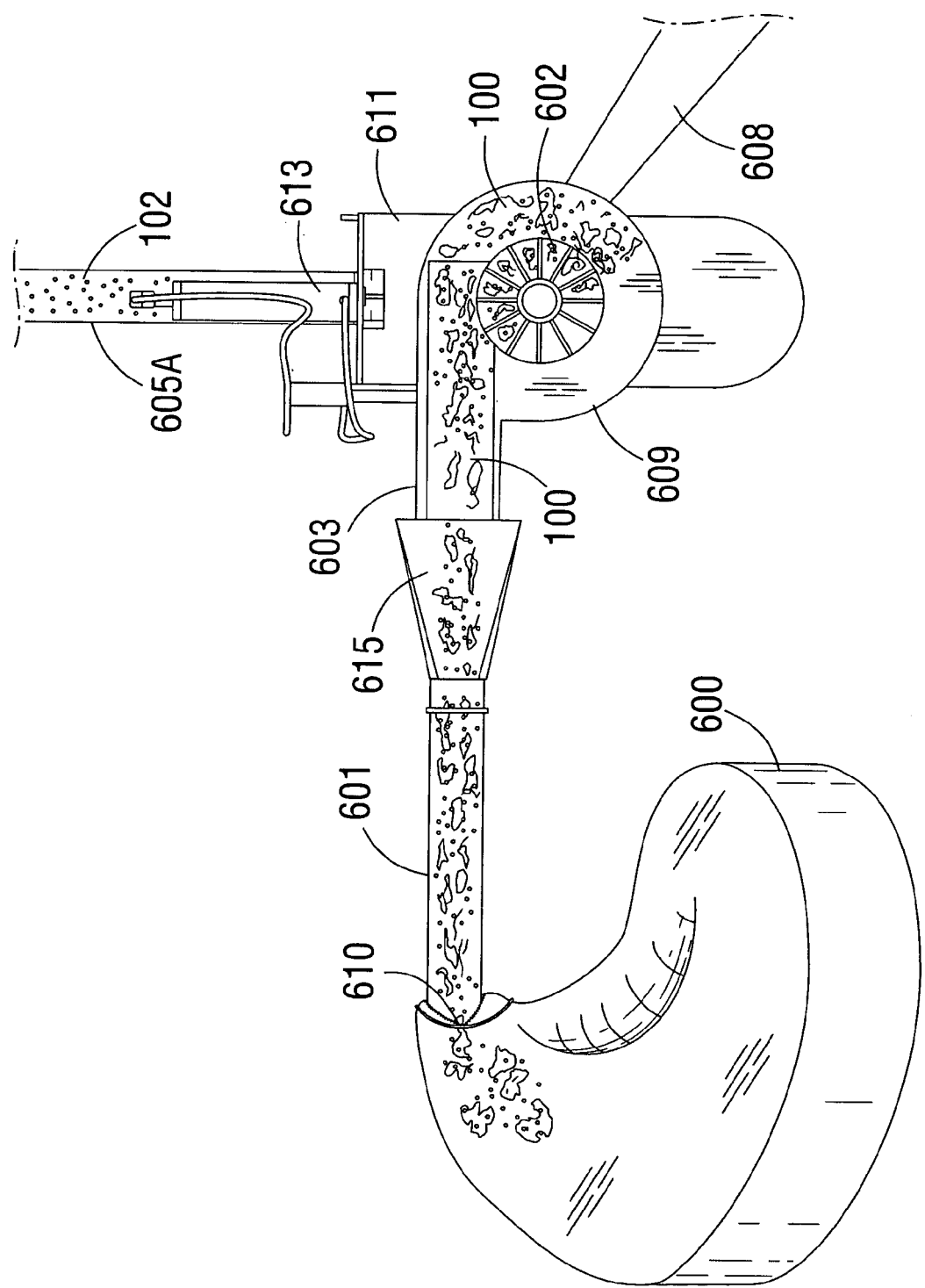
FIG. 6 is an end view, partially in cross-section, of the output section of the fill machines of FIGS. 3 and 4, together with an output utilization device.

Referring now to FIG. 6, there is shown an end view of the mixing/blending apparatus. The beads 102 are supplied via conduit 605A as described supra. The fibers 104 are supplied via the port 608. The gate 611 (as described relative to FIG. 5) is selectively controlled by the actuator 613 (pneumatic or otherwise) and selectively passes the filter components to blower 609.

A bladed fan or similar device 602 is rotatably driven by a suitable mechanism such as a motor (see FIG. 3). Fan 602, also known as an impeller, creates a significant air flow through housing 609 and outwardly through port 603.

Port 603 is inserted into (or attached to) nozzle 615 which is inserted into the fill-tube 601. The fill-tube is inserted into a fill opening 610 in the utility device 600 which may be a unit of soft furniture or any of a host of devices.

When utilization device 600 is filled to the desired extent by blend 100, gate 611 is closed to prevent further fill mixture from being produced and supplied. Utilization device 600 is removed from fill-tube 601 and opening 610 is sealed in any convenient manner such as, but not limited to, a zipper.

While it is contemplated that utilization device 600 can be manually engaged with the fill-tube 601, it is also understood that automatic filling techniques can be used, as well.

Figure 7:
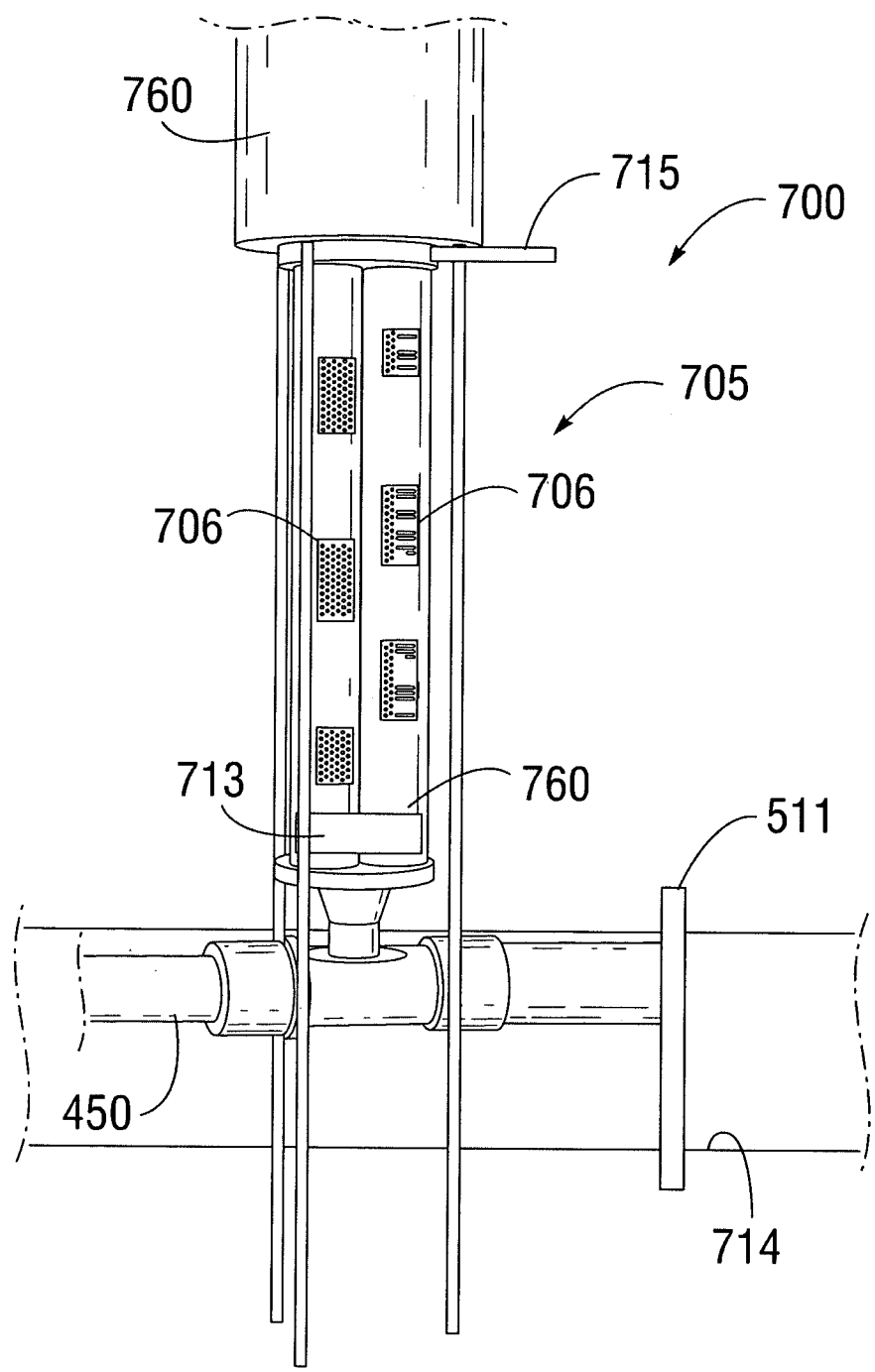
FIG. 7 is an elevation view of a bead measuring tower.

Referring now to FIG. 7, there is shown an enlarged rendering of tower 700 which is akin to tower 305 or 461 which are described supra. Typically, tower 700 is a cylindrical shaped component (although other shapes are contemplated) supported by stanchions 701 or similar apparatus.

The upper segment 760 of tower 700 is, in effect, an interim storage bin which receives the gravity fed beads 102 from the bottom of hopper 311 (FIG. 3) or the conduit 401A (FIG. 4). Gate 715 is located at the lower end of upper segment 760 and is operable to selectively pass beads into the lower portion 705, as desired.

The lower portion 705 is, in effect, the measuring portion of the cylindrical tower 700 and selectively supplies beads 102 into the conduits associated with the blending chamber 550 as discussed supra.

In a preferred embodiment, the lower portion 705 of cylinder body 700 includes one or more transparent windows 706 therein. Thus, the interior of the lower portion 705 of cylinder body 700, and the beads stored therein, are readily visible.

Typically, each window segment represents a "cube," i.e., is a measurement of beads. By incorporating several windows 706, different volumes (or cubes) of interior space within the lower portion 705 of tower 700 are readily discernible. These volumetric spaces are calibrated with regard to the volume (i.e., number) of beads (or cubes) stored in the lower portion of cylinder body 705. By selecting the number of cubes of beads which are stored and then released, the ratio of beads to fiber, noted above, can be accurately controlled.

The gate 713 (see also FIG. 4 for a schematic representation) is preferably mounted adjacent to the lower end 760 of the lower portion 705 of the tower cylinder 700. Although this placement is not critical to the operation of the tower, improved operation of the apparatus can be achieved. Gate 713 is, generally, in the default closed position thereby blocking beads 102 from passing from the lower body 705 into the conduit 714 and blending chamber 550 associated therewith.

In this configuration, the operator of the system (in a manual operation) is able to visually determine when a previously determined number of beads 102 is stored within the lower portion 705 of the tower body.

When the preselected number of beads is present, the operator opens gate 713 to allow the beads to pass through conduit 714 which is located within the fiber source conduit 491. When gate 511 (see FIG. 5) is opened, the beads and the fiber components are mixed in mixing chamber 550. In this manner, i.e. monitoring the quantity of beads to be provided, the bead-to-fiber ratio of the fill supplied to the utility device is determined.

Of course, it is contemplated that an automated operation can be initiated by using appropriate sensing devices to determine the bead count and to automatically open gates 715, 713 and 511 at the appropriate times, such that a predefined ratio of beads to fiber is determined thereby assuring the desired composite 100 is produced.

In summary, the invention is directed to an apparatus for controlling the preparation of a unique blend of fill material which has desirable qualities including cost control, and an apparatus for effecting this blend.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed. Hence, it is to be understood, however, that the invention is not limited to the specific features shown and described, since the means herein disclosed comprise preferred forms of putting the invention into effect. The invention is, therefore, claimed in any of its forms or modifications within the scope of the appended claims. Furthermore, no limitations are intended to the details of construction or design shown herein, other than as described in the claims below. It is therefore evident that the particular embodiments disclosed above may be altered or modified and all such variations are considered within the scope and spirit of the invention.

The invention claimed is:

1. An apparatus for creating a composite fill product comprising;
   first means for supplying a first type of polymer material,
   second means for supplying a second type of polymer material,
   first transporting means for transporting said first type of polymer material,
   second transporting means for transporting said second type of polymer material,
   means included in said first transporting means for determining, by volume, a specific quantity of said first type of polymer material, and
   means for mixing said specific quantity of said first type of polymer material supplied by said first means for supplying with said second type of polymer material supplied by said second means for supplying in selected ratios by volume.

2. The apparatus recited in claim 1, wherein;
   said first type of polymer material comprises an expanded polystyrene (EPS) bead particle.

3. The apparatus recited in claim 1, wherein;
   said second type of polymer includes an opened polyester fiber.

4. The apparatus recited in claim 1, including;
   output means for transferring the mixture of said first and second types of polymer material from said means for mixing into a utilization device.

5. The apparatus recited in claim 1, wherein;
   said means for determining a specific quantity of said first type of polymer material comprises a selectively operated storage unit within said first transporting means.

6. The apparatus recited in claim 5, wherein;
   said first type of polymer includes an expanded polystyrene (EPS) bead particle.

7. The apparatus recited in claim 5, wherein;
   said storage unit includes at least one transparent section for viewing the bead particles retained therein.

8. The apparatus recited in claim 1, including;
   output means for transferring said mixture of said first and second types of polymer from said mixing means into a utilization device.

9. The apparatus recited in claim 1, wherein;
   said first and second transporting means comprise first and second conduits connected between said first and second means for supplying, respectively, and said means for mixing.

10. The apparatus recited in claim 9, wherein;
    said means for mixing comprises a chamber formed by the intersection of said first and second conduits.

11. The apparatus recited in claim 1, wherein;
    said means for determining comprising a selectively movable barrier in one of said first and second transporting means to selectively retain the first or second type of polymer material in order to capture a preselected quantity, by volume, of the respective first or second type of polymer material.

12. In combination;
    first supply means for supplying a prescribed volume of a first type of polymer material which includes a plurality of bead particles,
    second supply means for supplying a second type of polymer material which includes an opened polymer fiber, mixing means for selectively mixing a prescribed volume of said first type of polymer material from said first supply means with said second type of polymer material from said second supply means in selected ratios by volume, and output means for transferring the mixture of said first and second types of polymer material from said mixing means to a utilization device.

13. The combination recited in claim 12, wherein;

each said bead particle is mixed with and suspended in said opened polymer fiber in said mixing means in a non-ordered array, said opened polymer fiber comprises at least one of polypropylene, polyethylene or polyester, said bead particles comprise virgin EPS bead particles, and said utilization device comprises a deformable outer skin for defining a frameless furniture unit.

14. The combination recited in claim 11, wherein;

said first type of polymer comprises a plurality of EPS bead particles.

15. The combination recited in claim 12, wherein;

said output means includes a radial fan for impelling said mixture into said utilization device.

16. An apparatus for creating a composite fill product comprising;

first source means for supplying a first type of polymer material in the form of bead particles, second source means for supplying a second type of polymer material in the form of opened polymer fiber, first transporting means for transporting said first type of polymer material from said first source means, second transporting means for transporting said second type of polymer material from said second source means, measuring means included in said first transporting means for determining, by volume, a specific quantity of said first type of polymer material, said measuring means comprising a selectively movable barrier in one of said first and second transporting means to selectively retain therein the respective first or second type of polymer material in order to capture a preselected quantity, by volume, of the respective first or second type of polymer, mixing means for mixing said specific quantity of said first or second type of polymer material supplied by said first or second means with said second or first type of polymer material supplied by said second or first means in selected ratios, by volume such that each said bead particle is mixed with and suspended in said opened polymer fiber in a random manner, and said first and second transporting means each comprise a separate conduit connected between said first and second source means, respectively, and said mixing means, and output means for transferring the mixture of said first and second types of polymer from said mixing means into a utilization device.

17. The apparatus recited in claim 16, wherein;

said first type of polymer includes an expanded polystyrene (EPS) bead particle, and said second type of polymer includes an opened polyester fiber.

\* \* \* \* \*